United States Patent [19]

Sandor

[11] 4,114,019
[45] Sep. 12, 1978

[54] WELDING OF LAMINATIONS OF CORE-PLATED SILICON STEEL

[75] Inventor: Leslie W. Sandor, St. Paul, Minn.

[73] Assignee: Electric Machinery Mfg. Company, Minneapolis, Minn.

[21] Appl. No.: 753,430

[22] Filed: Dec. 22, 1976

[51] Int. Cl.² .............................................. B23K 9/00
[52] U.S. Cl. .................................. 219/137 R; 219/74
[58] Field of Search ............ 219/76, 137 WM, 137 R, 219/130, 74, 137; 310/217

[56] References Cited

U.S. PATENT DOCUMENTS

| | | | |
|---|---|---|---|
| 2,715,193 | 8/1955 | Staley .................................. | 310/217 |
| 2,928,932 | 3/1960 | Huggins .......................... | 310/217 X |
| 3,012,162 | 12/1961 | Rediger ............................ | 310/217 X |
| 3,102,948 | 9/1963 | McCampbell .................... | 219/137 R |
| 3,264,445 | 8/1966 | Arnoldy ............................... | 219/76 |
| 3,378,669 | 4/1968 | Dolomont ................... | 219/137 WM |
| 3,832,514 | 8/1974 | Antonov ................................ | 219/76 |

Primary Examiner—E. A. Goldberg
Attorney, Agent, or Firm—Merchant, Gould, Smith, Edell, Welter & Schmidt

[57] ABSTRACT

The disclosure is directed to apparatus for and a method of joining a plurality of laminations of electric steel, which are individually core-plated for electrical insulation purposes, to form a laminate structure used in the manufacture of electrical machinery. Joinder of the laminations is accomplished with the laminations in face-to-face relation and arc welding a bead transverse to the stacked lamination edges. To avoid porosity in the weld bead, the arc welding process uses microwire having a diameter of no greater than about 0.050 inches in a moving welding head that maintains the microwire in close proximity to the welding surface. The operating voltage of the arc welding apparatus is controlled to produce an operating welding current of no more than about 170 amperes. The effect of using microwire of such size under such an operating current prevents overheating and degradation of the coreplate, and results in a proper deposition of a strong, non-porous weld bead.

28 Claims, 6 Drawing Figures

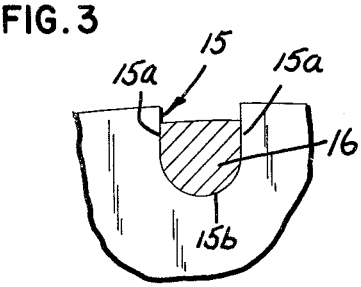
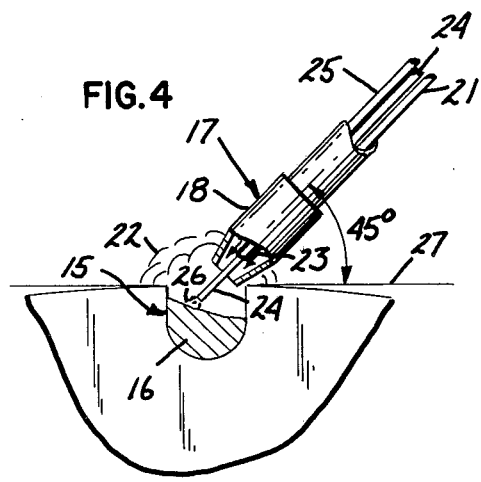
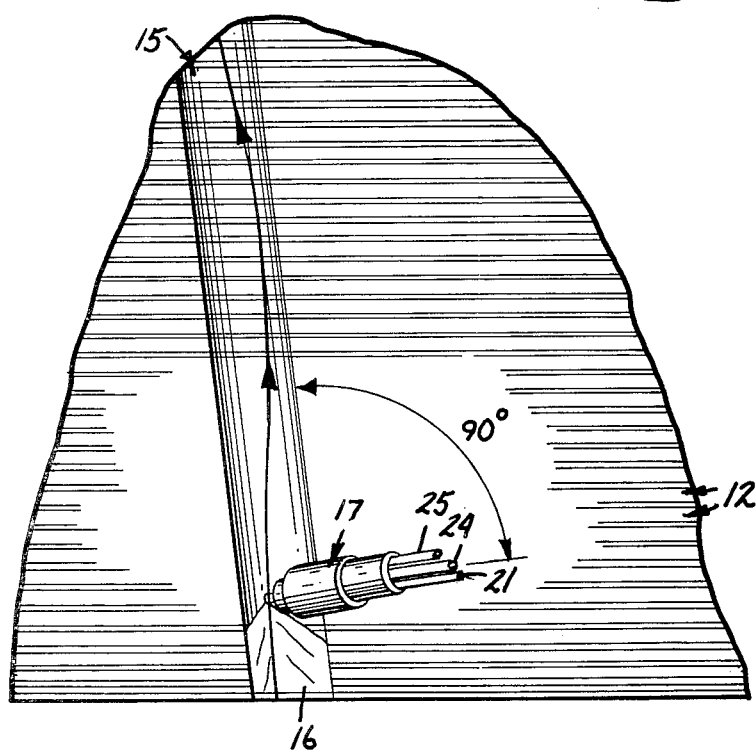
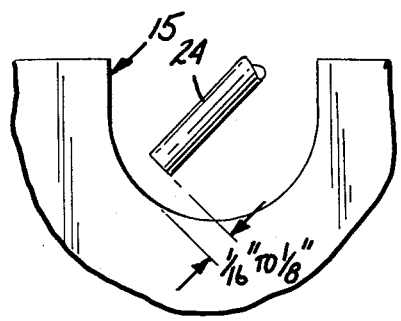

WELDING OF LAMINATIONS OF CORE-PLATED SILICON STEEL

The invention is generally related to arc welding, and is specifically directed to apparatus for and a method of metal arc welding core-plated electric steel with a sound weld bead.

The manufacture of electrical mechinery often involves formation of a laminate structure from a plurality of electrically insulated metallic laminations of predetermined thickness and configuration. Typically, the laminate material is silicon steel of electrical grade which, for example, may have a laminate thickness of 0.025 inches (gauge 24) and a silicon content of 2% by weight. The laminate material is core plated on both sides for electrical insulation purposes. A typical application is to create a stack of annular rings from the core-plated laminations, each ring being formed from a plurality of arcuate segments, the joints of which are staggered relative to adjacent annular rings. Upon mechanical fastening, the annular structure constitutes the stator of an electric machine.

It has long been the practice to mechanically secure the annular structure with nuts and bolts or similar fasteners, or with an external frame which holds the laminations in fixed position. From the standpoints of component cost, labor cost, manufacturing difficulty and life dependency, such mechanical connections have been disadvantageous. Welding the laminate structure would represent a substantial cost savings and at the same time provide for excellent life dependency, but it has never been possible to weld core-plated silicon steel with any degree of success.

The reason for this difficulty arises from the heat generated during the welding process, which causes a transformation of the electrically insulating core plate from solid to gaseous form. The weld bead remains in molten form for only a few seconds, but it is during this time that the core plate becomes gaseous and rises through the weld puddle in an attempt to escape. If all or a portion of the gas cannot escape before the weld reaches a solid temperature, the gas becomes entrapped in the solidified weld bead, resulting in a porous weld. Porosity makes the weld bead unacceptable because it has poor mechanical strength and little ductility, both of which are required for a successful, long-life mechanical connection.

In an endeavor to solve this long-standing problem I have discovered that controlling the head input to the weld, and confining the weld process to small finite interfacial areas can produce high-strength, pore-free welds having a long life expectancy in the operating environment of electric machines. More specifically, I have found that the use of a wire having a very small diameter (microwire) in a metal arc welding process (preferably with a shielding gas) operating in a predetermined range of welding current can result in nonporous weld beads of the type desired.

The inventive apparatus and method have resulted from a determination of how porosity in a weld bead on core-plated electric steel is created, and controlling the weld environment in such a manner that porosity is eliminated. As pointed out above, porosity arises from transformation of the core plate into a gaseous state, and the inability of at least some of the gas bubbles from escaping prior to solidification of the weld puddle. It will be appreciated that porosity increases with increasing thickness of the core plate, with increasing temperature of the weld (the amount of heat generate), and increasing interfacial area between the core-plated substrate and the weld bead. The interfacial area and the heat input in combination determine the affected core plate volume, which is an extremely important parameter in influencing weld soundness. Stated otherwise, for a given set of welding conditions and parameters, the smaller the affected volume, the less the resultant porosity.

I have developed a low temperature welding system which is contained in small, finite interfacial areas, thus resulting in a very small affected volume as the weld bead is created. As pointed out above, the inventive apparatus and method make use of a wire of very small diameter (microwire), which I have determined should not be greater than about 0.050 inches in diameter. The welding method is carried out with an operating amperage of not greater than about 170 amperes. From the detailed description below, it will be appreciated that these values generally represent the upper limit of the respective variables, it being clear from experimental work that porosity increases exponentially if either variable is increased beyond this point. Generally, the larger the electrode, the greater the current required to reduce the electrode to molten form. Thus, it will be appreciated that the inventive method will operate extremely well with much smaller wire and at much lesser operating currents. However, the rate of deposition decreases significantly as well, which is a practical problem due to the time required in building up a weld bead of sufficient structural strength. Optimally, I use a microwire of approximately 0.035 inches in diameter, and a welding current of about 150–170 amperes.

In addition to these primary parameters, I have found that other parameters are also of importance, among them arc length, open circuit voltage, arc voltage, travel speed, shielding gas pressure, position of the welding gun, intensity of air movement in the welding area (draft) and positive ground connection to the workpiece. The effect of each of these parameters on the inventive welding method has been taken into consideration in producing an optimal weld bead, and is discussed below.

BRIEF DESCRIPTION OF THE DRAWINGS

FIG. 3 is an enlarged, fragmentary view of one of the regions of the stator where a weld bead is applied as a mechanical connection;

FIG. 4 is a view similar to that of FIG. 3, showing in addition an arc welding gun in the process of depositing the weld bead;

FIG. 5 is a fragmentary view in top plan in which the laminations are represented on an enlarged scale for purposes of clarity, and showing the pattern of movement of the arc welding gun as it moves relative to the transverse welding groove; and FIG. 6 is a further enlarged fragmentary view in side elevation of the transverse groove and the relative position of the welding electrode.

DESCRIPTION OF THE PREFERRED EMBODIMENT

Figure 1:
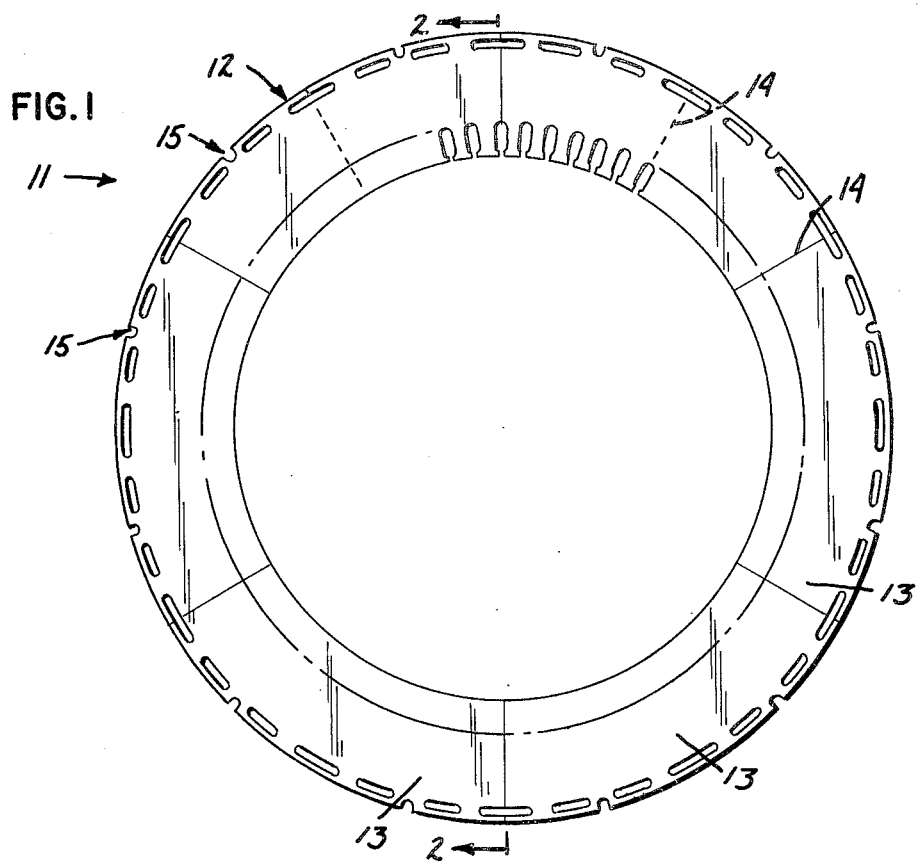
FIG. 1 is a view in side elevation of a stator formed from a plurality of core-plated, silicon steel laminations which are mechanically secured in fixed relation by welding in accordance with the invention.
Figure 2:
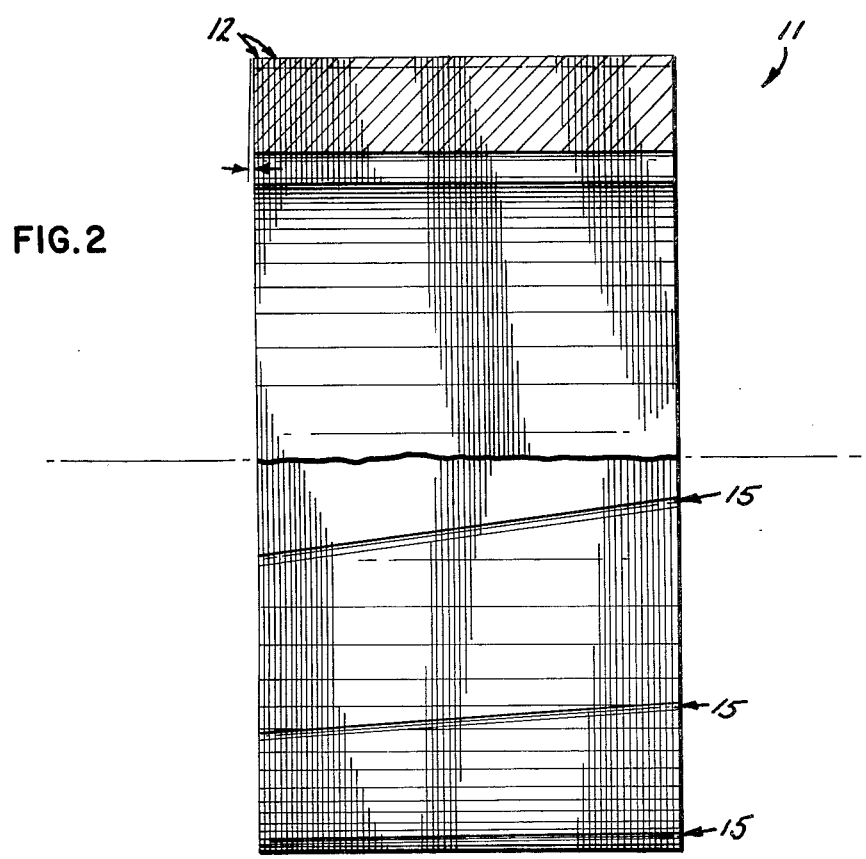
FIG. 2 is a sectional view of the stator taken along the line 2—2 of FIG. 1.

With initial reference to FIGS. 1 and 2, a stator is represented generally by the numeral 11. Stator 11 is annular in form, constructed for use with a rotor of appropriate size (not shown), the stator and rotor together operating electromagnetically as an electric machine in the known manner. As is well known in the art, the stator may vary widely in size, and its specific configuration is exemplary as disclosed. As particularly shown in FIG. 2, stator 11 is formed from a substantial number of virtually identical annular laminations 12 which are stacked in face-to-face relation to form a solid mass. To produce the desired function, as is well known in the electric machinery art, each of the annular rings 12 is formed from electrically conductive material (e.g., silicon steel), but each is electrically insulated from adjacent laminations 12 by core plating both sides. The core-plating material varies with the specific application, and by manufacturer as well; and reference is made to standard handbooks and reference texts for electrical engineers for a discussion of such materials.

For stators of significant size, the annular laminations 12 may for purposes of convenience be broken down into a plurality of identical arcuate segments 13. The segments 13 not only are much easier to fabricate than an entire lamination 12, but also are much less unwieldly in the assembly process of large stators. As shown, each of the annular laminations 12 comprises six arcuate segments 13 the face surfaces of which lie in common planes. The ends of adjacent arcuate segments 13 are disposed in full abutting relation for maximum electrical conductivity. These end joints, which are represented by the numeral 14, are staggered in adjacent laminations 12 so that there is no continuous axial joint which would otherwise weaken the structure.

Since the arcuate segments 13 are identical, their outer edges together define a smooth, cylindrical outer surface for the stator 11.

To assist in the welding connection, the stator 11 is formed with a plurality of transverse grooves 15 which are commonly parallel to each other and to the stator axis, and equiangularly spaced about the aforementioned cylindrical outer surface. In this specific embodiment there are twelve such transverse grooves 15.

Although it is possible to form the transverse grooves 15 after the stator 11 has been assembled, it is preferable for them to be preformed within each of the identical arcuate segments 13. To this end, and as shown in FIG. 1, each of the segments 13 is formed with a centrally disposed essentially semicircular notch 15, and two essentially quarter circular notches at each end which form semicircular notches with adjacent segments 13. The notches 15 are easily punched in the segment 13 during their fabrication.

FIG. 3 is an enlarged view of one of the transverse grooves 15, which has opposed parallel sides 15a and a rounded bottom 15b. A solidified weld bead 16 is shown deposited in the transverse grooves 15.

The purpose of the transverse grooves 15 is to create a large surface area to the weld bead 16, thus enabling it to provide greater structural strength and enhance its mechanical connecting ability. Stated otherwise, the transverse groove 15 makes optimum use of the side surfaces of the weld bead 16 by increasing the size of the contact area between the groove 15 and weld bead 16. It would be possible to deposit the weld bead 16 on the essentially flat cylindrical surface of the stator 11, but this would of course reduce the contact surface areas. It will also be appreciated that transverse grooves 15 cause the weld bead 16 to be recessed from the outer cylindrical surface, as shown in FIG. 3, so that the weld bead 16 does not obstruct fitting of the stator 11 with other components.

With reference to FIGS. 4 and 5, a welding head or gun represented generally by the numeral 17 is disclosed relative to a transverse groove 15 for depositing a weld bead 16. Welding gun 17 is preferably of the gas shielding type, and to that end includes a nozzle carried at the end of a sheath 19. A conduit 21 continuously supplies shielding gas to the nozzle 18, from which it emanates as a gas shield 22 protectively surrounding the weld area.

Disposed within nozzle 18 is a wire guide 23 to which a solid wire electrode 24 is continuously supplied. A conductor 25 is in electrical communication with the electrode 24 so that, with the electrode 24 disposed in close proximity to the groove 15 and weld bead 16, an arc 26 results to melt and commonly fuse the substrate (the core-plated lamination 12) and the electrode 24. The conduit 21, electrode 24 and conductor 25 are encapsulated within the sheath 19.

As shown in the enlarged representation of FIG. 6, the distance between electrode 24 and the surface of groove 15 (or the weld bead 16) is minimal, being on the order of 1/16 to ⅛ inch. I have found that electrode distances of much greater than about ⅛ inch cause spattering within the molten weld puddle, tending to create an increased amount of porosity within the resulting weld bead.

As shown in FIGS. 4 and 5, the weld gun 17 and electrode 17 define an operational axis which can be positioned for optimum results. As shown in FIG. 4, the axis preferably subtends an angle of 45° relative to a line 27 which is tangent to the cylindrical outer surface of the stator 11 at the particular groove 15. As shown in FIG. 5, the axis preferably subtends an angle 90° with the line of groove 15. It will be appreciated that both of these angles can be varied somewhat without significantly affecting the quality or integrity of the resulting weld bead 16.

As shown in FIG. 5, it is also preferable that the welding gun 17 weave slightly from side to side as it moves relative to the transverse groove 15.

As pointed out above, it is highly important that the volume of the substrate affected by the arc welding process be maintained as low as possible to prevent excessive transformation of the core plate into gas with resulting porosity. This is accomplished by providing an electrode 24 (typically of carbon steel) having a relatively small effective mass; i.e., a mass which does not require substantial heat input to render it molten. Since the electrode wire 24 is necessarily continuously supplied to the weld region, it follows that its cross sectional area is the only variable which can be controlled in reducing its effective mass. I have found that superior results are achieved with a wire electrode having a circular cross section the diameter of which is no greater than about 0.050 inches. Of course, it would be possible to utilize an electrode of different cross sectional configuration, so long as its effective area were equivalent to or less than a circular area of 0.050 inch diameter.

The other variable of primary importance is welding current, as applied by the conductor 25. For a circular electrode having a diameter of 0.050 inches, a welding current of not more than about 170 amperes achieves the desired result.

In this regard, it will be appreciated that the specific wire size and welding current stated above actually represent upper limits of these parameters; i.e., the point at which resulting porosity in the weld bead 16 increases at an exponential rate. Thus, it is quite possible to use a wire electrode having a diameter which is many times smaller than 0.050 inches, and it follows that the welding current necessary to successfully arc weld with such an electrode is commensurately smaller. There is, however, a point at which this parameter reduction becomes impractical, since the smaller the wire the slower the rate of deposition and the longer it takes to fill one of the transverse grooves 15. Optimal performance is, therefore, obtained by using a wire electrode 24 having a diameter of 0.035 inches, and applying a voltage sufficient to create an operating current of about 150–170 amperes. The optimum arc voltage (i.e., the voltage drop from the electrode to the weld puddle or substrate) should be on the order of 25 volts. The open circuit voltage for the system described is preferably on the order of 32 volts.

Optimum results were obtained with a shielding gas of an inert gas, such as carbon dioxide, supplied to the weld area at a rate of on the order of 45 cubic feet per hour. The weld area is preferably devoid of drafts, and a suitable enclosure or barrier around the weld area is recommended for this purpose.

With optimum control of the several parameters as outlined above, the electrode 24 is fed to the wire guide 23 at a rate of about 80 inches per minute. The welding gun 17 is capable of continuously producing a nonporous weld bead at the rate of about 12 inches per minute.

I have also determined that a second pass of the welding gun 17 over an already formed weld bead effects a further reduction of porosity. The reason for this is that those air pockets or pores situated near the top surface of the existing weld bead are eliminated by the second pass as it remelts the existing weld bead and allows the previously captured gas bubbles to escape.

Preferably, an arc welding machine is used which is capable of automatically producing nonporous weld beads in accordance with the invention on an automatic basis. This can be accomplished by moving the welding head relative to the workpiece or substrate or vice versa. The use of an automatic machine maintains the optimum parameter values at essentially constant levels so that uniform, nonporous weld beads of high integrity are always deposited.

What is claimed is:

1. A method of joining a plurality of metallic laminations each of which is core-plated for electrical insulating purposes to form a laminate structure of predetermined configuration, comprising:
   (a) placing the core-plated laminations together face to face with portions of the lamination edges relatively disposed to define a welding surface;
   (b) and arc welding a bead on the welding surface transverse to the lamination edges by
      (1) continuously supplying to a movable welding head a microwire electrode having an effective cross sectional area equivalent to a circular area the diameter of which is no greater than about 0.050 inches;
      (2) moving the welding head over the welding surface transversely to the lamination edges with the microwire electrode in close proximity to the welding surface;
      (3) and applying a voltage to the microwire electrode which results in an operating welding current of no more than about 170 amperes, whereby a substantially nonporous weld bead is deposited on the welding surface as the welding head is moved.

2. The method defined in claim 1, which comprises the further step of forming a transverse groove in the lamination edges which define the welding surface, and arc welding the nonporous bead in the transverse groove.

3. The method defined by claim 2, wherein the weld bead is continuously deposited in the transverse groove.

4. The method defined by claim 2, wherein the laminations comprise annular rings the outer edges of which are aligned to form an outer cylindrical surface, and a plurality of transverse grooves are formed in said cylindrical surface.

5. The method defined by claim 4, wherein the annular laminations define a common axis in assembled form, and the transverse grooves are formed in common parallel relation with said axis and with each other.

6. The method defined by claim 5, wherein the transverse grooves are equiangularly spaced around the cylindrical surface.

7. The method defined by claim 4, wherein each annular ring is formed by preassembling a plurality of identical arcuate segments which together define the ring.

8. The method defined by claim 7, wherein the junctures of arcuate segment ends of one annular ring are staggered with respect to those of adjacent annular rings.

9. The method defined by claim 7, wherein said plurality of transverse grooves are formed by deforming appropriately disposed notches in each arcuate segment, and aligning the notches to define the transverse grooves.

10. The method defined by claim 2, wherein the transverse groove has opposed, substantially parallel sides and a rounded bottom.

11. The method defined by claim 1, wherein the welding bead and microwire electrode define a predetermined axis of operation, said axis being disposed about 45° relative to the welding surface, and about 90° relative to the line of welding head movement.

12. The method defined by claim 1, wherein the welding head is moved from side to side in weaving fashion within the lateral confines of the weld bead as it progresses over its transverse path.

13. The method defined by claim 1, wherein the welding head is moved over the same transverse path on the welding surface at least two times to form the weld bead.

14. The method defined by claim 1, wherein the microwire is applied to the welding head at a rate of on the order of 80 inches per minute.

15. The method defined by claim 1, wherein the welding head is moved relative to the welding surface at a rate of on the order of 12 inches per minute.

16. The method defined by claim 1, wherein the microwire electrode is maintained relative to the welding surface and weld bead to create an arc length of about 1/16 of an inch to ⅛ of an inch.

17. The method defined by claim 1, which comprises the further step of creating a gas shield which surrounds the welding area to preclude its exposure to atmospheric oxygen.

18. The method defined by claim 17, wherein the gas shield is created from an inert gas.

19. The method defined by claim 18, wherein the inert gas is applied to the welding area at a rate of about 45 cubic feet per hour.

20. The method defined by claim 1, which comprises the further step of protecting the weld area from atmospheric drafts.

21. The method defined by claim 1, wherein the voltage applied to the microwire electrode creates an arc voltage of on the order of 25 volts.

22. The method defined by claim 21, wherein the voltage applied to the microwire electrode is on the order of 32 volts.

23. The method defined by claim 1, wherein the microwire electrode is circular in cross section and has a diameter of about 0.035 inches.

24. The method defined by claim 23, wherein the welding current is maintained in the range of about 150–170 amperes.

25. A method of joining a plurality of metallic laminations each of which is core-plated for electrical insulating purposes to form a laminate structure of predetermined configuration, comprising:
    (a) placing the core-plated laminations together face to face with portions of the lamination edges relatively disposed to define a welding surface;
    (b) and arc welding a bead on the welding surface transverse to the lamination edges by
        (1) continuously supplying to a welding head a microwire electrode having an effective cross sectional area equivalent to a circular area the diameter of which is no greater than about 0.050 inches;
        (2) effecting relative movement between the welding head and welding surface transversely to the lamination edges with the microwire electrode in close proximity to the welding surface;
        (3) and applying a voltage to the microwire electrode which results in an operating welding current of no more than about 170 amperes, whereby a substantially nonporous weld bead is deposited on the welding surface as the welding head is moved.

26. A method of arc welding an essentially nonporous weld bead on a metallic substrate which is core-plated for electrical insulating purposes, comprising:
    (a) positioning the core-plated metallic substrate relative to a welding head;
    (b) continuously supplying to the welding head a microwire electrode having an effective cross sectional area equivalent to a circular area the diameter of which is no greater than about 0.050 inches;
    (c) effecting relative movement between the substrate and the welding head with the microwire electrode in close proximity to the substrate;
    (d) and applying a voltage to the microwire electrode which results in an operating welding current of no more than about 170 amperes, whereby said weld bead is continuously deposited as relative movement occurs between the substrate and welding head.

27. The method defined by claim 26, wherein the microwire electrode is maintained relative to the substrate and weld bead to create an arc length of about 1/16 of an inch to ⅛ of an inch.

28. The method defined by claim 26, wherein the core-plated metallic substrate is maintained in a fixed position, and the welding head is moved relative thereto to effect said relative movement.

* * * * *